(12) United States Patent
Choi (10) Patent No.: US 9,638,271 B2
(45) Date of Patent: May 2, 2017

(54) BRAKE DEVICE FOR VEHICLE (71) Applicant: HYUNDAI MOBIS CO., LTD., Seoul (KR)

(72) Inventor: Moo Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 17 days.

(21) Appl. No.: 14/686,566

(22) Filed: Apr. 14, 2015

(65) Prior Publication Data

US 2016/0025171 A1 Jan. 28, 2016

(30) Foreign Application Priority Data

Jul. 23, 2014 (KR) .................. 10-2014-0093469

(51) Int. Cl.
*F16D 65/14* (2006.01)
*F16D 51/28* (2006.01)
(Continued)

(52) U.S. Cl.
CPC ............. *F16D 51/28* (2013.01); *F16D 51/30* (2013.01); *F16D 65/563* (2013.01);
(Continued)

(58) Field of Classification Search
CPC ............. F16D 2125/20; F16D 2125/22; F16D 2125/52; F16D 2125/46; F16D 2125/58; F16D 2125/70; F16D 2125/40; F16D 65/08; F16D 65/563; F16D 65/22; F16D 65/56; F16D 65/561; F16D 2065/386; F16D 2129/10; F16D 51/22; F16D 51/24; F16D 51/50; F16D 51/52; F16D 2121/24
See application file for complete search history.

(56) References Cited

U.S. PATENT DOCUMENTS 2,060,879 A * 11/1936 La Brie .................. F16D 51/50
188/330
2,084,972 A * 6/1937 Irving .................... F16D 51/50
188/332

(Continued)

FOREIGN PATENT DOCUMENTS

DE       102005025296 A1 * 12/2006 ............. F16D 65/14
KR    10-2009-0082822 A     7/2009

*Primary Examiner* — Bradley King
*Assistant Examiner* — Stephen Bowes
(74) *Attorney, Agent, or Firm* — Knobbe Martens Olson & Bear LLP (57) ABSTRACT

A brake device for a vehicle may include: a driving unit positioned in a drum and supplying rotation power; a nut screw positioned between first and second brake shoes; a first push rod having both sides connected to the first brake shoe and the nut screw, and pressurizing the first brake shoe through the rotation of the nut screw; a fixing protrusion fixed to a case surrounding the nut screw; a rotation connection part coupled to the fixing protrusion to restrict rotation of the rotation connection part; a rotation control part inserted into the rotation connection part so as to be screwed to the rotation connection part; and a second push rod having both sides connected to the second brake shoe and the rotation control part, and moved together with the rotation control part in a longitudinal direction so as to pressurize the second brake shoe.

7 Claims, 6 Drawing Sheets

(51) Int. Cl.
  *F16D 51/30* (2006.01)
  *F16D 65/56* (2006.01)
  *F16D 121/24* (2012.01)
  *F16D 125/40* (2012.01)
  *F16D 121/04* (2012.01)
  *F16D 125/52* (2012.01)

(52) U.S. Cl.
  CPC ...... *F16D 2121/04* (2013.01); *F16D 2121/24* (2013.01); *F16D 2125/40* (2013.01); *F16D 2125/52* (2013.01)

(56) References Cited

U.S. PATENT DOCUMENTS

| | | | | |
|---|---|---|---|---|
| 2,144,086 A * | 1/1939 | Parker | ............... | F16D 65/562 |
| | | | | 188/196 BA |
| 2,188,453 A * | 1/1940 | Bock | ............... | F16D 65/22 |
| | | | | 188/106 A |
| 4,706,784 A * | 11/1987 | Shellhause | ............ | F16D 65/566 |
| | | | | 188/196 BA |
| 4,986,394 A * | 1/1991 | Taft | ............... | F16D 65/22 |
| | | | | 188/217 |
| 5,590,744 A * | 1/1997 | Belmond | ............... | B60T 7/107 |
| | | | | 188/2 D |
| 6,460,660 B1 * | 10/2002 | Shaw | ............... | F16D 65/563 |
| | | | | 188/162 |
| 2006/0278477 A1 * | 12/2006 | Balz | ............... | F16D 51/48 |
| | | | | 188/156 |
| 2013/0087422 A1 * | 4/2013 | Park | ............... | F16D 65/22 |
| | | | | 188/325 |

* cited by examiner

BRAKE DEVICE FOR VEHICLE

CROSS-REFERENCES TO RELATED APPLICATIONS

The present application claims priority to Korean application number 10-2014-0093469, filed on Jul. 23, 2014, which is incorporated by reference in its entirety.

BACKGROUND

The present disclosure relates to a brake device for a vehicle, and more particularly, to a brake device for a vehicle, which forms a braking force by spreading brake shoes to both sides using a driving force of a motor installed in a drum brake.

A drum-type brake device for a vehicle includes a wheel cylinder and a brake shoe which are installed in a drum. When a driver steps on a brake pedal, the wheel cylinder is operated to pressurize both sides of the brake shoe, thereby forming a braking force. Furthermore, when the driver operates a parking lever to park the vehicle, a push rod is operated to move the brake shoe in a direction where the brake shoe comes in contact with the drum, thereby generating a braking force.

The related art is disclosed in Korean Patent Laid-open Publication No. 2009-0082822 published on Jul. 31, 2009 and entitled "Drum-type brake device for vehicle".

SUMMARY

Embodiments of the present invention are directed to a brake device for a vehicle, which forms a braking force by spreading brake shoes to both sides using a driving force of a motor installed in a drum brake.

In one embodiment, a brake device for a vehicle may include: a driving unit positioned in a drum and supplying rotation power; a nut screw positioned between first and second brake shoes, and rotated by the rotation power received from the driving unit; a first push rod having both sides connected to the first brake shoe and the nut screw, and pressurizing the first brake shoe through the rotation of the nut screw; a fixing protrusion fixed to a case surrounding the nut screw, and protruding in the reverse direction to the first push rod; a rotation connection part coupled to the fixing protrusion to restrict rotation of the rotation connection part; a rotation control part inserted into the rotation connection part so as to be screwed to the rotation connection part, and moved together with the rotation connection part; and a second push rod having both sides connected to the second brake shoe and the rotation control part, and moved together with the rotation control part in a longitudinal direction so as to pressurize the second brake shoe.

The driving unit may use an electric motor, and an output shaft of the driving unit and the nut screw may be engaged with a connection gear so as to transmit power.

The nut screw may include: a nut body having a female screw formed on the inside thereof, into which the first push rod is inserted; and a nut gear formed along the outer circumference of the nut body.

When the connection gear engaged with the output shaft is rotated, the nut body may be rotated while the nut gear engaged with the connection gear is rotated.

The first push rod may include: a first body inserted into the nut body so as to be engaged with a female screw of the nut body; and a first grip part extended from the first body so as to be locked to the first brake shoe.

The first push rod may form a braking force while pressurizing the first brake shoe to come in contact with the drum, or release a braking force while being moved away from the first brake shoe.

The rotation connection part may include: a rotation connection body having both sides into which the fixing protrusion and the rotation control part are inserted; and a side protrusion formed to protrude to the outside of the rotation connection body.

A polygonal groove may be formed at one side of the rotation connection body into which the fixing protrusion is inserted, and a female screw may be formed on the inner surface of the rotation connection part facing the outside of the rotation control part.

The rotation control part may include: a rotation control body inserted into the rotation connection part, and having a male screw formed on the outside thereof; a control gear protruding along the outer circumference of the rotation control body; and a rotation control protrusion extended from the rotation control body and inserted into the second push rod.

The second push rod may include: a second body into which the rotation control protrusion is inserted; and a second grip part extended from the second body so as to be locked to the second brake shoe.

The brake device may further include: a control lever installed to rotate with respect to the second brake shoe, and installed at a position facing the control gear; and an elastic control member having both sides connected to the control lever and the second brake shoe, and pulling the control lever using a preset elastic force.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In an example of a parking brake system using a drum brake, the power of a motor is used to form a parking braking force for a drum brake. However, since the motor is positioned outside the drum brake, an additional layout is required. Furthermore, due to the reduction of water tightness, the operation reliability of the brake device may be degraded.

Figure 1:
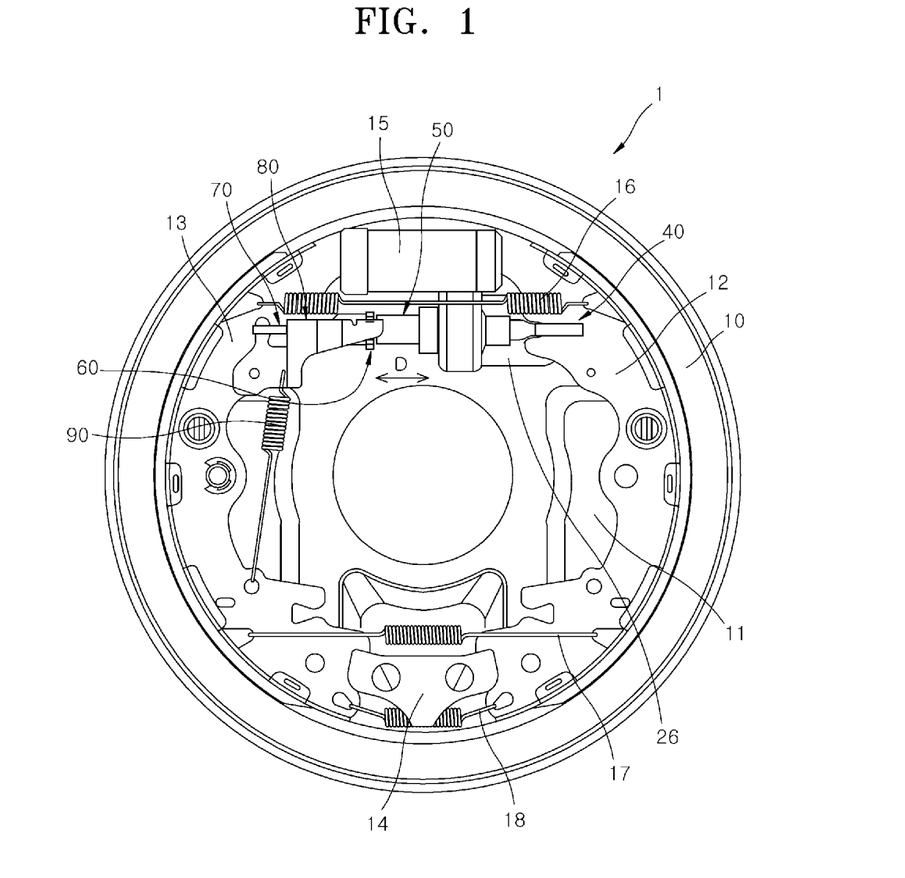
FIG. 1 is a schematic front view of a brake device for a vehicle in accordance with an embodiment of the present invention.

FIG. 1 is a schematic front view of a brake device for a vehicle in accordance with an embodiment of the present invention.

As illustrated in FIG. 1, the brake device 1 in accordance with the embodiment of the present invention may include a driving unit 20, a nut screw 30, a first push rod 40, rotation connection part 50, a rotation control part 60, a second push rod 70, a control lever 80, and an elastic control member 90.

A drum 10 may be installed along the outer circumference of a base plate 11 formed in a disk shape, and include first and second brake shoes 12 and 13 provided therein. Since the bottoms of the first and second brake shoes 12 and 13 are hinge-connected to an anchor 14, the first and second brake shoes 12 and 13 may be rotated about the anchor 14.

A wheel cylinder 15 may be installed above the first and second brake shoes 12 and 13. When a control signal is transmitted to the wheel cylinder during operation of the vehicle, the wheel cylinder 15 may pressurize the first and second brake shoes 12 and 13 to the outside where the drum 10 is positioned. Between the wheel cylinder 15 and the anchor 14, first and second return springs 16 and 17 may be installed in a horizontal direction (based on FIG. 1). Both sides of the first and second return springs 16 and 17 may be connected to the first and second brake shoes 12 and 13, respectively. Under the anchor 14, a third return spring 18 may also be formed in the horizontal direction. Both sides of the third return spring 18 may be connected to the bottoms of the first and second brake shoes 12 and 13.

Figure 2:
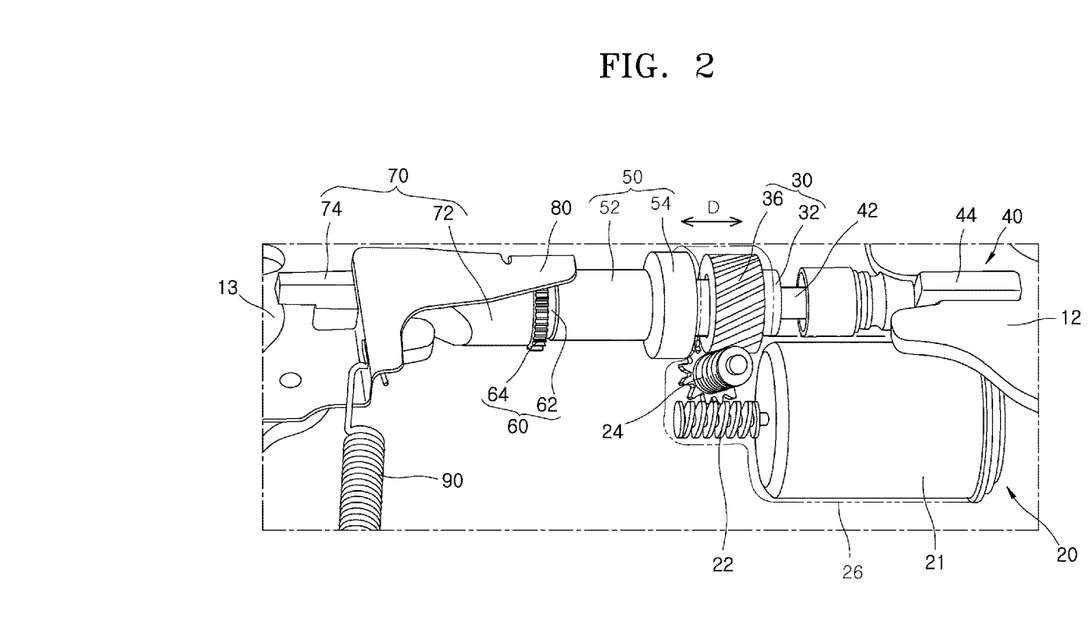
FIG. 2 is a perspective view schematically illustrating components of the brake device for a vehicle in accordance with the embodiment of the present invention.
Figure 3:
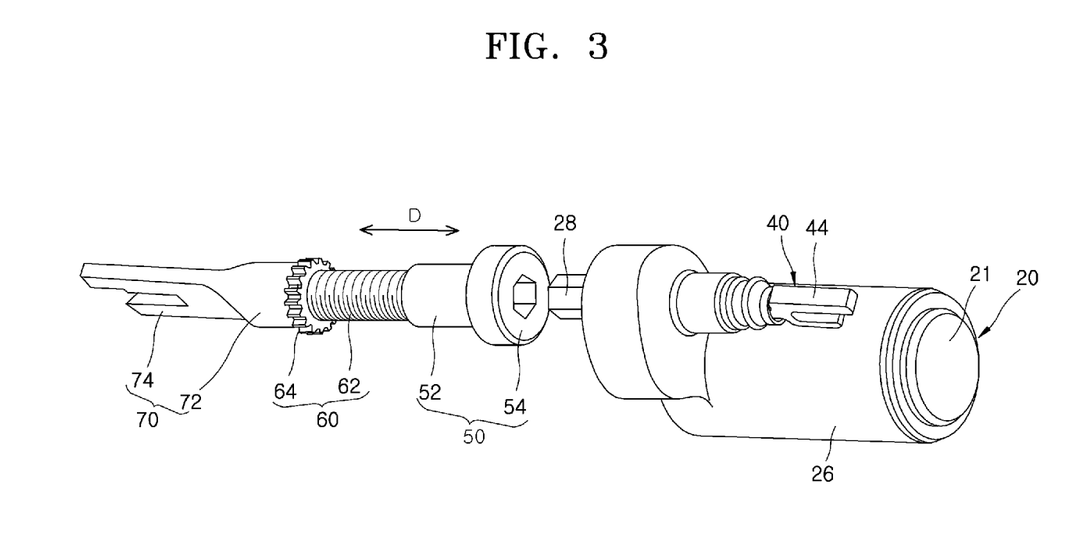
FIG. 3 is a perspective view schematically illustrating a state in which a nut screw is separated from a rotation connection part in accordance with the embodiment of the present invention.
Figure 4:
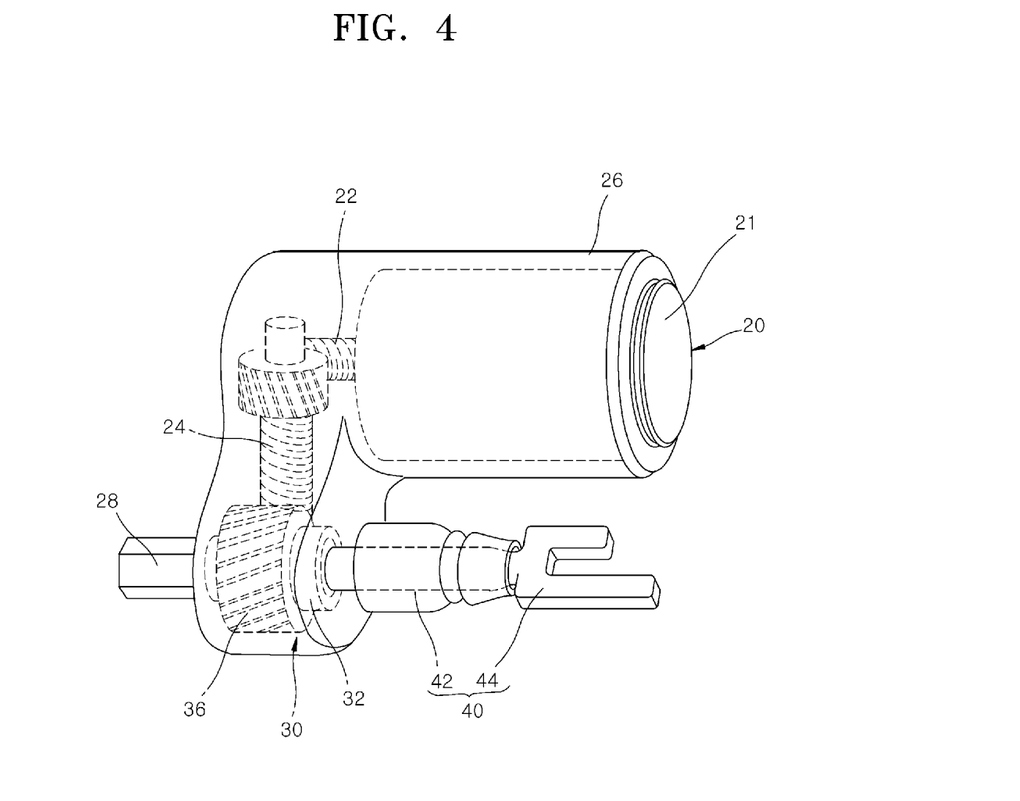
FIG. 4 is a perspective view schematically illustrating a state in which a driving unit is connected to the nut screw through a connection gear in accordance with the embodiment of the present invention.

FIG. 2 is a perspective view schematically illustrating components of the brake device for a vehicle in accordance with the embodiment of the present invention. FIG. 3 is a perspective view schematically illustrating a state in which the nut screw 30 is separated from the rotation connection part 50. FIG. 4 is a perspective view schematically illustrating a state in which the driving unit 20 in accordance with the embodiment of the present invention is connected to the nut screw 30 through a connection gear 24.

As illustrated in FIGS. 1 to 4, the driving unit 20 may include various types of driving devices, as long as the driving unit 20 is positioned in the drum 10 so as to supply rotation power. The driving unit 20 in accordance with the embodiment of the present invention may include an electric motor 21 and an output shaft 22.

The electric motor 21 may be positioned in the drum 10, and installed between the first brake shoe 12 and the base plate 11 so as not to interface with the first and second brake shoes 12 and 13 during operation of the first and second brake shoes 12 and 13. The output shaft 22 of the electric motor 21 and the nut screw 30 may be engaged with the connection gear 24 so as to transmit power. The connection gear 24 may be formed in a bar shape, and have a spiral screw thread formed on the outer surface thereof. The screw thread of the connection gear 24, which comes in contact with the output shaft 22, has a different shape from the screw thread of the connection gear 24, which comes in contact with the nut screw 30. The connection gear 24 may be installed to be engaged with the outside of the output shaft 22 and the outside of the nut screw 30 while forming a right angle to the output shaft 22.

A case 26 may be installed to surround the driving unit 20 and the nut screw 30, and fixed to the base plate 11. Since the driving unit 20 is fixed to the inside of the case 26 and the nut screw 30 is rotatably installed in the case 26, external foreign matters may be substantially prevented from being introduced into the nut screw 30.

The first push rod 40 may be positioned at one side (right side in FIG. 2) of the case 26 in the longitudinal direction D, and a fixing protrusion 28 may be positioned at the other side (left side in FIG. 2) of the case 26 in the longitudinal direction D. The fixing protrusion 28 may be formed in various shapes as long as the fixing protrusion 28 is fixed to the case 26 and protrudes in the reverse direction to the first push rod 40.

The fixing protrusion 28 may be extended from the case 26 and inserted into the rotation connection part 50, and have a longitudinal cross-section formed in a polygonal shape.

The nut screw 30 may include various types of gears, as long as the nut screw 30 is positioned between the first and second brake shoes 12 and 13 and rotated by rotation power received from the driving unit 20. The nut screw 30 in accordance with the embodiment of the present invention may include a nut body 32 and a nut gear 36.

Figure 5:
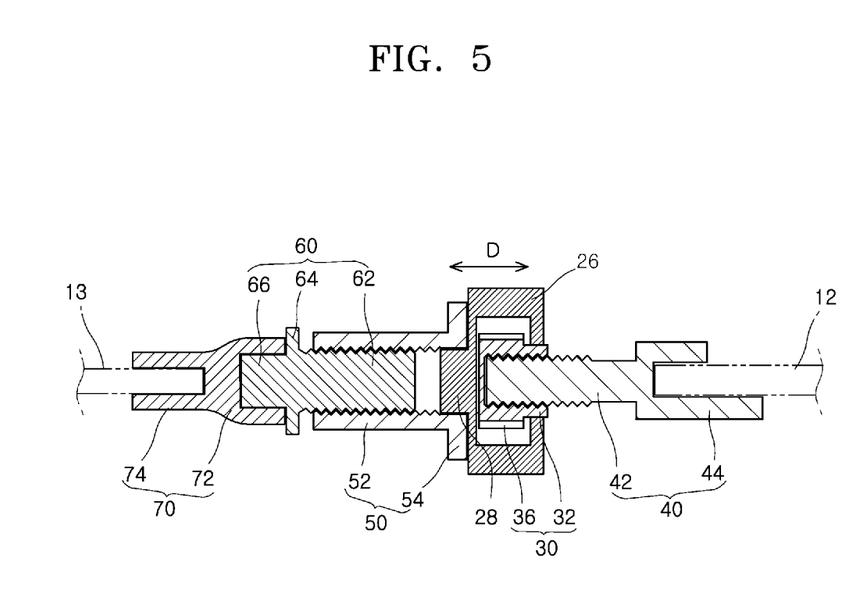
FIG. 5 is a cross-sectional view schematically illustrating the components of the brake device for a vehicle in accordance with the embodiment of the present invention.
Figure 6:
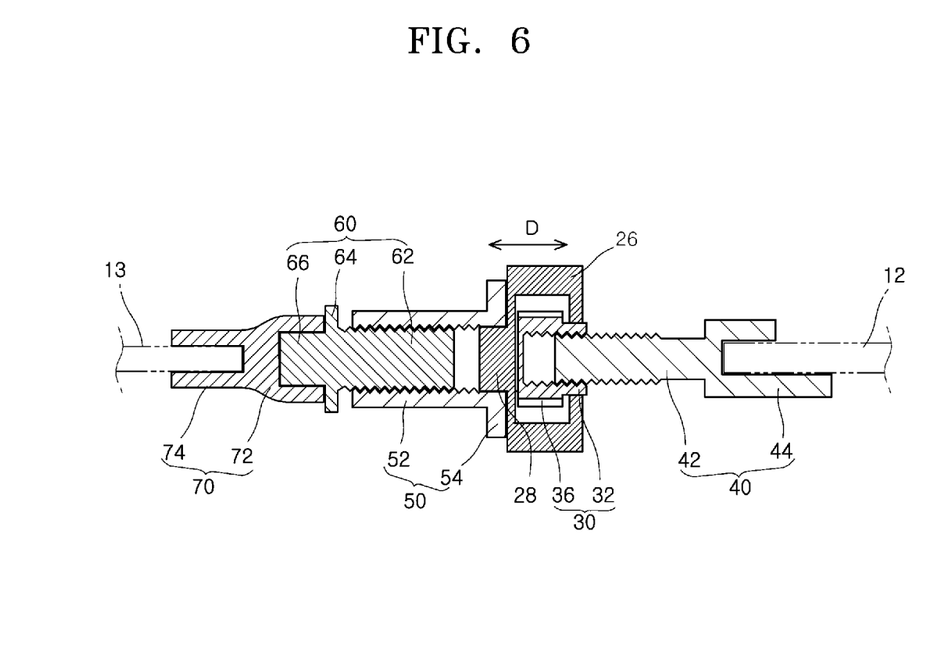
FIG. 6 is a cross-sectional view schematically illustrating a state in which first and second brake shoes are moved to both sides based on the nut screw in accordance with the embodiment of the present invention.

FIG. 5 is a cross-sectional view schematically illustrating the components of the brake device for a vehicle in accordance with the embodiment of the present invention. FIG. 6 is a cross-sectional view schematically illustrating a state in which the first and second brake shoes 12 and 13 are moved to both sides based on the nut screw 30 in accordance with the embodiment of the present invention.

As illustrated in FIGS. 5 and 6, the nut body 32 may be formed in a pipe shape, and have a female screw formed on the inside thereof, into which the first push rod 40 is inserted. The nut body 32 may have a groove formed at one side thereof in the longitudinal direction D (right side in FIG. 5), and the first push rod 40 may be inserted into the groove.

The nut gear 36 may be formed along the outer circumference of the nut body 32, and installed to be engaged with the connection gear 24. Thus, when the connection gear 24 engaged with the output shaft 22 is rotated, the nut gear 36 engaged with the connection gear 24 may rotate the connection gear 24. Since the nut gear 36 is integrated with the nut body 32, the nut body 32 may be rotated together with the nut gear 36.

The first push rod 40 may be formed in various shapes, as long as the first push rod 40 has both sides connected to the first brake shoe 12 and the nut screw 30 and is moved by the rotation of the nut screw 30 so as to pressurize the first brake shoe 12. The first push rod 40 in accordance with the embodiment of the present invention may include a first body 42 and a first grip part 44.

The first body 42 may be formed in a cylindrical shape, and have a male screw formed on the outside thereof. The first body 42 may be inserted into the nut body 32 such that the male screw thereof is engaged with the female screw formed in the nut body 32.

The first grip part 44 may be formed in various shapes, as long as the first grip part 44 is extended from the first body 42 and locked to the first brake shoe 12 to restrict the rotation of the first grip part 44. The first grip part 44 in accordance with the embodiment of the present invention may be formed in a U-shape, and the first brake shoe 12 may be inserted and locked to an inner groove of the first grip part 44.

Thus, when the nut screw 30 is rotated in a state where the first push rod 40 is locked to the first brake shoe 12 such that the rotation of the first push rod 40 is restricted, the first body 42 of which the screw thread is engaged with the nut screw 30 may be moved in the longitudinal direction D. Thus, the first push rod 40 may form a braking force while pressurizing the first brake shoe 12 to come in contact with the drum 10, or release a braking force while being moved away from the first brake shoe 12.

The rotation connection part 50 may be formed in various shapes, as long as the rotation connection part 50 is installed at a position facing the first push rod 40 with the case 26 provided therebetween and coupled to the fixing protrusion 28 such that the rotation thereof is restricted. The rotation connection part 50 in accordance with the embodiment of the present invention may include a rotation connection body 52 and a side protrusion 54. The rotation connection body 52 may have both sides into which the fixing protrusion 28 and the rotation control part 60 are inserted, and the side protrusion 54 may protrude to the outside of the rotation connection body 52.

The rotation connection body 52 may be extended along the longitudinal direction D, the fixing protrusion 28 may be inserted into one side of the rotation connection body 52, and the rotation control body 62 of the rotation control part 60 may be inserted into the other side of the rotation connection body 52. The fixing protrusion 28 may have a longitudinal cross-section formed in a polygonal shape, and a polygonal groove may be formed at the one side of the rotation connection body 52 into which the fixing protrusion 28 is inserted. Thus, since the fixing protrusion 28 fixed to the case 26 is inserted into the rotation connection body 52, the rotation connection part 50 may be installed in a state where the rotation thereof is restricted.

Furthermore, the rotation connection body 52 facing the outside of the rotation control part 60 may have a female screw on the inner surface thereof, and the rotation control body 62 have a male screw formed on the outer surface thereof. Thus, when the rotation control body 62 is inserted into the rotation connection body 52, the male screw of the rotation control body 62 and the female screw of the rotation connection body 52 may be engaged with each other.

The side protrusion 54 may be formed to protrude to the outside from one side of the rotation connection body 52, and installed in contact with the outside of the case 26.

The rotation control part 60 may be formed in various shapes, as long as the rotation control part 60 is inserted into the rotation connection part 50 so as to be screwed to the rotation connection part 50, and moved together with the rotation connection part 50 in the longitudinal direction D. The rotation control part 60 in accordance with the embodiment of the present invention may include a rotation control body 62, a control gear 64, and a rotation control protrusion 66.

The rotation control body 62 may be formed in a cylindrical shape and inserted into the rotation connection part 50, and a spiral male screw may be formed on the outer surface of the rotation control body 62. The rotation control body 62 may be inserted into the rotation connection body 52 such that the screws threads thereof are engaged with each other.

The control gear 64 may be formed to protrude along the outer circumference of the rotation control body 62, and rotated in contact with the elastic control member 90. When one side of the rotation control body 62 is inserted into the rotation connection body 52, the control gear 64 may be positioned at the other side of the rotation control body 62. The control gear 64 may be installed at the other side of the rotation control body 62, which is not inserted into the rotation connection body 52. Thus, when the control lever 80 rotates the control gear 64, the rotation control body 62 may be rotated together with the control gear 64.

The rotation control protrusion 66 may be formed in a cylindrical shape, and extended from the rotation control body 62 so as to be inserted into the second push rod 70. Thus, the rotation control part 60 may be installed to rotate with respect to the second push rod 70.

The second push rod 70 may be formed in various shapes, as long as the second push rod 70 has both sides connected to the second brake shoe 13 and the rotation control part 60, and moved together with the rotation control part 60 in the longitudinal direction D so as to pressurize the second brake shoe 13. The second push rod 70 in accordance with the embodiment of the present invention may include a second body 72 and a second grip part 74. The rotation control protrusion 66 may be inserted into one side of the second body 72 in the longitudinal direction D, and the second grip part 74 may be connected to the other side of the second body 72 in the longitudinal direction D.

The second grip part 74 may be formed in various shapes, as long as the second grip part 74 is extended from the second body 72 and locked to the second brake shoe 13 to restrict the rotation of the second grip part 74. The second grip part 74 in accordance with the embodiment of the present invention may be formed in a U-shape, and the second brake shoe 13 may be inserted and locked to an inner groove of the second grip part 74.

Thus, when the rotation control part 60 is rotated together with the control gear 64 in a state where the second push rod 70 is locked to the second brake shoe 13 to restrict rotation, the rotation control body 62 of which the screw thread is engaged with the rotation connection part 50 may be moved in the longitudinal direction D. Thus, the rotation control body 62 may form a constant braking force while being moved in a direction away from the rotation connection part 50 by an abrasion amount of a friction material installed on the first and second brake shoes 12 and 13.

The control lever 80 may be rotatably installed on the second brake shoe 13, and formed at a position facing the control gear 64. One side of the control lever 80 in accordance with the embodiment of the present invention may be hinge-connected to the second brake shoe 13, and the other side of the control lever 80 may be installed in contact with the control gear 64.

The elastic control member 90 may include various types of elastic members, as long as the elastic control member 90 has both sides connected to the control lever 80 and the second brake shoe 13 and pulls the control lever 80 using a preset elastic force. The elastic control member 90 in accordance with the embodiment of the present invention may include a coil spring. The elastic control member 90 may rotate the control lever 80 in the clockwise direction in proportion to the abrasion amount of the friction material installed on the second brake shoe 13, and control the length at which the rotation control part 60 protrudes from the rotation connection part 50.

Hereafter, referring to the accompanying drawings, the operation state of the brake device 1 for a vehicle in accordance with the embodiment of the present invention will be described in detail.

In order to form a braking force when parking or stopping the vehicle, a driver may hold down an operation switch provided in the vehicle so as to operate the electric motor 21. When the output shaft 22 is rotated through the operation of the electric motor 21, the connection gear 24 engaged with the output shaft 22 may be operated to rotate the nut gear 36 of the nut screw 30.

When the nut body 32 moves the first push rod 40 while being rotated together with the nut gear 36, a braking force may be generated while the first push rod 40 moves the first brake shoe 12 in a direction where the first brake shoe 12 comes in contact with the drum 10 (right side in FIG. 1).

Since the first push rod 40 is extended in a direction away from the nut body 32 in a state where the first brake shoe 12 pressurizes the drum 10, the fixing protrusion 28 connected to the case 26 may pressurize the rotation connection part 50. When the fixing protrusion 28 pushes the rotation connection part 50 in a direction where the second brake shoe 13 is installed, the rotation control part 60 and the second push rod 70 may be moved by the rotation connection part 50.

Then, as the second push rod 70 moves the second brake shoe 13 in a direction where the second brake shoe 13 comes in contact with the drum (right side in FIG. 1), a braking force may be generated.

The first and second brake shoes 12 and 13 may have a friction material attached to the outside thereof, and the elastic control member 90 may pull the control lever 80 in the clockwise direction in proportion to the abrasion amount of the friction material. Since the control lever 80 is installed in contact with the control gear 64, the control gear 64 may rotate the rotation control body 62.

Since the screw threads of the rotation control body 62 and the rotation connection body 52 are engaged with each other, the rotation control body 62 may be moved to the outside of the rotation connection body 52 in proportion of the number of rotations of the rotation control body 62. Thus, since the rotation connection body 52 is moved in proportion to the abrasion amount of the friction material, the interval between the drum 10 and the friction materials attached to the first and second brake shoes 12 and 13 may be constantly maintained.

As described above, a braking force may be formed as the first and second brake shoes 12 and 13 are spread to both sides by the driving force of the driving unit 20 installed in the drum 10. Thus, the size of the product can be reduced.

Furthermore, since the moving distances of the first and second push rods 40 and 70 are determined through the operation of the driving unit 20 using the electric motor 21, the stroke can be easily controlled.

Furthermore, since the length at which the rotation control part 60 is inserted into the rotation connection part 50 is adjusted in proportion to the abrasion of the friction materials installed on the first and second brake shoes 12 and 13, the operation reliability of the brake device can be improved.

In accordance with the embodiment of the present invention, the brake device for a vehicle may form a braking force by spreading the first and second brake shoes to both sides using a driving force of the driving unit installed in the drum. Thus, the size of the product can be reduced.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A brake device for a vehicle, comprising:
   a brake drum comprising a friction surface;
   a first brake shoe disposed inside the brake drum and comprising a first shoe surface configured to face a first portion of the friction surface;
   a second brake shoe disposed inside the brake drum and comprising a second shoe surface configured to face a second portion of the friction surface;
   a motor positioned inside the brake drum;
   a rotation member operably connected to the motor for rotation about an axis and comprising a first set of threads configured to threadedly engage with a second set of threads for converting rotation of the rotation member about the axis to a linear movement of the second set of threads along the axis;
   a first push rod extending between a first distal end and a first proximal end, the first distal end connected to the first brake shoe, the first proximal end comprising the second set of threads threadediy engaged with the first set of threads of the rotation member;
   a second push rod extending between a second distal end and a second proximal end, the second distal end connected to the second brake shoe;
   a length adjustment mechanism comprising a connection part and a control part, the connection part comprising a third set of threads, the control part comprising a fourth set of threads threadedly engaged with the third set of threads of the connection part such that the control part and the connection part linearly move relative to each other along the axis to change a combined length of the control part and the connection part in the axis; and
   a case surrounding the rotation member and comprising a protrusion protruding in a direction away from the first push rod, the protrusion connected to the connection part of the length adjustment mechanism;
   wherein the first brake shoe, the first push rod, the rotation member, the length adjustment mechanism, the second push rod and the second brake shoe are arranged in order along the axis such that as the combined length changes a distance between the first and second brake shoes is adjusted,
   wherein as the rotation member rotates about the axis by operation of the motor, set of threads of the rotation member is configured to rotate relative to the second set of threads of the first push rod and to cause the first push rod to linearly move along the axis relative to the rotation member for braking or debraking action of the first brake shoe,
   wherein the case is configured to not rotate about the axis by operation of the motor or rotation of the rotation member and accordingly configure to not rotate the connection part of the length adjustment mechanism, wherein, as the first push rod to linearly move along, the axis relative to the rotation member, the length adjustment mechanism and the second push rod linearly move along, the axis relative to the first push rod.

2. The brake device of claim 1, further comprising an output shaft of the motor, the output shaft being engaged with the rotation member using a connection gear.

3. The brake device of claim 1, wherein the rotation member comprises:

a nut body having internal female threads as the first set of threads; and a nut gear formed on an outer circumference of the nut body.

4. The brake device of claim 3, wherein the first push rod comprises:

a threaded portion inserted into the nut body; and a first grip portion extended from the threaded portion and fixed to the first brake shoe.

5. The brake device of claim 1, wherein the connection part of the length adjustment mechanism comprises female threads as the third set of threads.

6. The brake device of claim 1, wherein the control part of the length adjustment mechanism comprises male threads as the fourth set of threads.

7. The brake device of claim 1, wherein the control part of the length adjustment mechanism comprises a control gear with a plurality of teeth radially extending about the axis, wherein the brake device further comprises a control lever hingedly connected to the second brake shoe and is configured to engage with at least part of the plurality of teeth for rotating the control gear about the axis as it is hingedly rotating, such that as the control gear of the control part rotates about the axis, the control part and the connection part linearly move relative to each other along the axis, which changes the combined length of the control part and the connection part in the axis.

\* \* \* \* \*